United States Patent
Ropp et al.

(10) Patent No.: US 10,326,279 B2
(45) Date of Patent: Jun. 18, 2019

(54) SUBHARMONIC POWER LINE CARRIER BASED ISLAND DETECTION SYSTEMS AND METHODS

(71) Applicants: Michael Ropp, Brookings, SD (US); Scott Perlenfein, Brookings, SD (US); Jason C. Neely, Albuquerque, NM (US); Sigifredo Gonzalez, Albuquerque, NM (US); Lee Joshua Rashkin, Albuquerque, NM (US)

(72) Inventors: Michael Ropp, Brookings, SD (US); Scott Perlenfein, Brookings, SD (US); Jason C. Neely, Albuquerque, NM (US); Sigifredo Gonzalez, Albuquerque, NM (US); Lee Joshua Rashkin, Albuquerque, NM (US)

(73) Assignees: Northern Plains Power Technologies, Brookings, SD (US); Sandia Corporation, Albuquerque, NM (US)

( * ) Notice: Subject to any disclaimer, the term of this patent is extended or adjusted under 35 U.S.C. 154(b) by 221 days.

(21) Appl. No.: 15/213,191

(22) Filed: Jul. 18, 2016

(65) Prior Publication Data
US 2017/0077703 A1    Mar. 16, 2017

Related U.S. Application Data

(60) Provisional application No. 62/193,373, filed on Jul. 16, 2015.

(51) Int. Cl.
*H02J 3/00* (2006.01)
*H02J 3/38* (2006.01)
*H02H 3/17* (2006.01)
*H02J 13/00* (2006.01)

(52) U.S. Cl.
CPC ............ *H02J 3/383* (2013.01); *H02H 3/17* (2013.01); *H02J 3/381* (2013.01); *H02J 13/002* (2013.01); *H02J 13/0006* (2013.01); *H02J 3/386* (2013.01); *H02J 3/387* (2013.01); *H02J 2003/388* (2013.01); *Y02E 10/563* (2013.01); *Y02E 10/763* (2013.01); *Y02E 40/72* (2013.01); *Y04S 10/12* (2013.01); *Y04S 10/123* (2013.01)

(58) Field of Classification Search
CPC ............ H02J 3/383; H02J 3/381; H02H 3/17
USPC ............................................ 307/17
See application file for complete search history.

(56) References Cited

U.S. PATENT DOCUMENTS

| | | | |
|---|---|---|---|
| 2007/0093978 A1* | 4/2007 | Walling | H02J 3/38 702/60 |
| 2007/0149155 A1* | 6/2007 | Jorgenson | H04B 17/382 455/214 |
| 2011/0309684 A1* | 12/2011 | Song | H02J 3/383 307/87 |

* cited by examiner

*Primary Examiner* — Rexford N Barnie
*Assistant Examiner* — Dru Parries
(74) *Attorney, Agent, or Firm* — Patterson Thuente Pedersen, P.A.

(57) ABSTRACT

Systems and methods for identifying an island condition in a power distribution system and disconnecting distributed generators in the case of islanding. The systems and methods are used to enable reliable detection of island formation with high false-trip immunity, for any combination of distributed energy resources, and for distributed energy resources using grid support functions.

18 Claims, 9 Drawing Sheets

Fig. 14 a signal generator and an injection transformer that acted essentially as a large nonlinear load. Consider the generic distribution feeder 20 depicted in FIG. 1. Feeder 20 generally includes feeder series impedances 22, load blocks 24, 26, 28, 30, 32, 34, and distributed generators 36, 38, which are in this case, photovoltaic (PV) systems. Voltage source Utility V at the left, along with its source impedance Source Z, represent the grid from the standpoint of feeder 20.

SUBHARMONIC POWER LINE CARRIER BASED ISLAND DETECTION SYSTEMS AND METHODS

RELATED APPLICATIONS

The present application claims the benefit of U.S. Provisional Patent Application No. 62/193,373, entitled SUBHARMONIC POWER LINE CARRIER BASED ISLAND DETECTION SYSTEMS AND METHODS, and filed Jul. 16, 2015, which is hereby fully incorporated herein by reference.

GOVERNMENT RIGHTS

The Government has rights to this invention pursuant to Contract No. DE-AC04-94AL85000 awarded by the U.S. Department of Energy.

TECHNICAL FIELD

The invention relates generally to power distribution and more particularly to the detection by distributed energy resources of a connection to the grid.

BACKGROUND

As more distributed renewable generation is incorporated into the grid, well regulated conventional generation will be displaced by stochastic energy sources that can have adverse effects on the power system if not managed properly. It is well known that high penetrations of PV may have negative local impacts, including voltage rise, reverse power flow, power fluctuations, power factor changes, and unintentional islanding. In addition, there have been concerns that sufficiently high penetrations of PV may have negative wide-area impacts. Recent studies that consider the impact of PV on low frequency inter-area modes have reported that greater PV penetration may "detrimentally affect the inter-area mode" through reduction in damping or introduce the potential for new oscillatory modes. Anticipating the high penetration of PV distributed energy resources (DER) has thus led to significant changes in utility interconnection requirements that include voltage and frequency regulation requirements and voltage and frequency ride through requirements. These new requirements will help to avoid the aforementioned problems, but unfortunately they may decrease the efficacy of anti-islanding schemes. In particular, the IEEE 1547 standard requires that distributed generators detect an island and cease to energize within 2 seconds for all cases, regardless of the number or type of distributed generation or the loading conditions. Compliance is established through application of the IEEE 1547.1 anti-islanding test.

Furthermore, the anticipated high penetration of distributed photovoltaic (PV) energy sources is expected to lead to significant changes in utility interconnection requirements for PV systems. These changes will include provisions for voltage and frequency regulation capability, as well as better voltage and frequency ride through requirements. For DER to provide grid support, it must participate in frequency and voltage regulation. Frequency and voltage ride through allows inverters to remain connected to ensure robust recovery in the event of voltage and frequency disturbance. Implementing these advanced capabilities is essential to mitigating the negative impacts of high penetration PV, but their integration into a typical distribution system presents significant technical challenges, one of which is the increased risk of unintentional islanding.

Historically, subharmonic power line carrier signals have been injected into the distribution feeder by installing a signal generator and an injection transformer that acted essentially as a large nonlinear load. Consider the generic distribution feeder 20 depicted in FIG. 1. Feeder 20 generally includes feeder series impedances 22, load blocks 24, 26, 28, 30, 32, 34, and distributed generators 36, 38, which are in this case, photovoltaic (PV) systems. Voltage source Utility V at the left, along with its source impedance Source Z, represent the grid from the standpoint of feeder 20.

Figure 1:
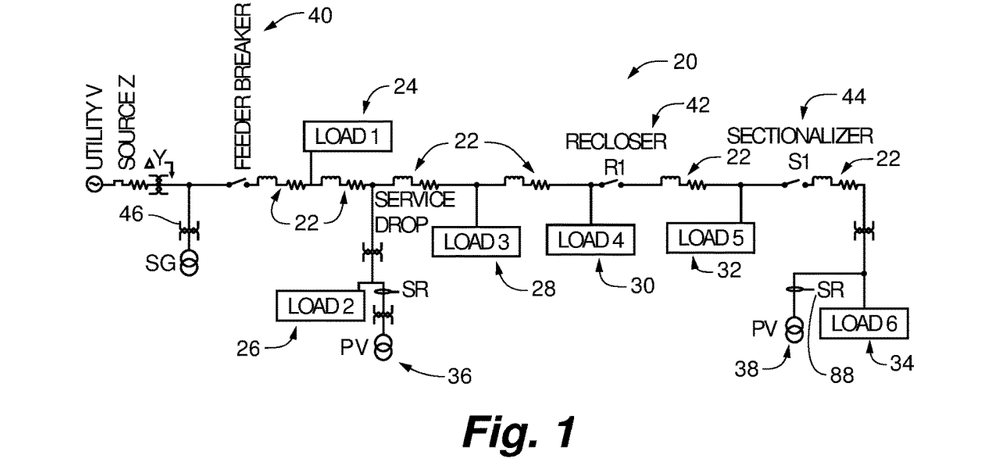
FIG. 1 is a schematic diagram of a grid with photovoltaic distributed generation modules wherein PLC signal injection is implemented using the historical method of shunt injection (short circuiting the phase currents)

Feeder 20 is fully connected to the grid when feeder breaker 40, recloser 42, and sectionalizer 44 are all closed. When the grid connection of feeder 20, or some portion of it, is lost, feeder 20 becomes an island, as may happen for example if feeder breaker 40 opens. In this conventional system, a power line carrier (PLC) signal generator SG is paired with two PLC signal receivers SR, one at each PV plant 36, 38. Typically, the subharmonic PLC signal is generated by shorting the SG transformer secondary to ground periodically, usually very close to the zero crossing of the voltage waveform in order to minimize currents in the harmonic components. The subharmonic signal is limited to be an integral subharmonic of the line frequency. This technique has been used for quite some time, but it requires a signal generator that can tolerate high currents, and an injection transformer 46 that carefully balances current limiting requirements with access impedance needs. Thus, the costs of this type of implementation are often sufficiently high that they serve as a barrier to the use of this technique for preventing islanding in DERs. In addition, the relatively large physical footprint of the SG and transformer 46 often cause difficulties in siting the SG in a utility substation.

A need remains, therefore, for systems and methods that enable reliable detection of island formation, in the presence of any combination of DERs, and with DERs incorporating grid support functions.

SUMMARY

Embodiments of the present invention address the need for systems and methods that enable reliable detection of island formation, in the presence of any combination of DERs, and with DERs incorporating grid support functions. The present disclosure is directed to systems and methods that use a continuous subharmonic signal, a power line carrier permissive (PLCP), that is injected at the transmission level, distribution level or at the substation and detected by any type of DERs in any combination. This may be referred to as an island detection system and method. Absence of the signal indicates loss of utility and possible island condition. The PLC system utilizes a power electronics based series voltage injection method, as opposed to the shunt injection systems used in the prior art as described above.

The present disclosure is further directed to a communication-based unintentional island detection method that relies on a Power Line Carrier Permissive (PLCP) signal that is carried between distribution/transmission components and the inverter to establish a connection to the grid. Absence of the permissive signal indicates disconnection from the grid. The method uses a subharmonic voltage being injected via a series injection transformer in series with one or more phases. For purposes of this patent application, the term "subharmonic" shall be interpreted to include any waveform component with a frequency less than the nominal line frequency, including undertones and inter-harmonics below the nominal line frequency. A subharmonic permissive signal has several advantages over high-frequency, high-bandwidth signals. It can pass through power transformers (including distribution transformers) without coupling or bypass capacitors, and thus could be used with roof-mounted PV or other DERs interconnected on the low voltage (LV) sides of distribution transformers. In addition, it will propagate over many miles of transmission line with little attenuation, and thus does not require downstream repeaters or the installation of any equipment on the feeder other than the signal receiver. It is also less susceptible to interference from active loads.

The present disclosure is further directed to apparatuses, processes, methods, and uses as described herein.

The present disclosure is further directed to methods for eliminating an island condition in a power grid including at least one distributed energy source selectively electrically coupled to the power grid through a switch. The method includes using a transmitter to inject a subharmonic voltage signal into the power grid on a power grid side of the switch, coupling a receiver on a distributed energy source side of the switch, detecting the presence or absence of the subharmonic voltage signal using the receiver, and if the subharmonic voltage signal is absent, de-energizing the at least one distributed energy source.

The present disclosure is further directed to methods for identifying an island condition in a power grid including the following steps: a) A subharmonic voltage signal is injected by a transmitter into the grid; b) Is the grid tied?; c) If the answer to step b is YES, then proceed to step d; if the answer is NO, then proceed to step g; d) Then the subharmonic voltage signal propagates over the power circuit; e) The subharmonic voltage signal is detected by a receiver; f) The utility connection is verified to device or system; g) Then the subharmonic voltage is blocked by an open circuit; h) The subharmonic voltage signal is not detected by a receiver; i) Island formation is communicated to a device or system.

According to an embodiment, a method for eliminating an island condition in a power grid including at least one distributed energy source selectively electrically coupled to the power grid through a switch electrically coupling a feeder to the power grid includes using a transmitter to inject a subharmonic voltage signal into the power grid through an injection transformer coupled in series with the feeder on a power grid side of the switch, coupling a receiver on a distributed energy source side of the switch, detecting the presence or absence of the subharmonic voltage signal using the receiver, and if the subharmonic voltage signal is absent, disconnecting the at least one distributed energy source from the feeder. The step of using the transmitter can include coupling the injection transformer in series with more than one phase of a multi-phase power feeder or in series with a single phase of a multi-phase power feeder.

In a further embodiment, a system for detecting an island condition in a feeder of a power grid, wherein the feeder includes at least one distributed energy source selectively electrically coupled to the power grid through a switch, includes a signal generator electrically coupled to the power grid through an injection transformer coupled in series with the feeder. The transmitter includes a voltage source inverter, wherein the signal generator emits a signal through the power grid and feeder at a subharmonic frequency of a frequency of the power grid. A receiver can be electrically coupled to the feeder. The receiver can include a digital signal processor providing a logic signal output, the logic signal output indicating whether the signal emitted by the signal generator is detected by the receiver.

In embodiments of the invention the subharmonic frequency may be 17 Hertz. The signal generator may include an electro-magnetic interference filter and a voltage clamp. The receiver can include a sharp-cutoff low-pass filter. The digital signal processor may run algorithms based on a Fourier series calculation, with or without averaging of results at the subharmonic frequency.

In embodiments of a system according to the invention the injection transformer may be coupled in series with a single phase of a multi-phase power system, or in series with more than one phase of a multi-phase power system. The distributed energy source may include photovoltaic cells, a wind-powered generator, or a fossil-fuel powered generator, or any combination thereof.

According to another embodiment, a method for detecting an island condition in a feeder of an electrical power grid, the feeder including at least one distributed electrical energy source selectively electrically coupled to the power grid through a switch, includes coupling a signal generator to a power grid side of the switch using an injection transformer in series with the feeder, generating a signal at a subharmonic frequency of the power grid using the signal generator, the signal being injected into the power grid and feeder through the injection transformer, electrically coupling a signal receiver to the power grid and feeder on a distributed energy source side of the switch, using the signal receiver to detect the presence or absence of the signal, and if the signal is absent, disconnecting the distributed energy source from the feeder and grid.

In embodiments of the invention, the step of coupling a signal generator may include connecting the injection transformer in series with a single phase of a multi-phase power system or in series with more than one phase of a multi-phase power system.

The distributed energy source may be, but is not limited to PV, wind and water generation, distributed fossil fuel generation and other renewable or non-renewable sources. In such a manner, the disclosed methods may be used to detect various kinds of "islanding" situations that may occur in a power grid no matter the distributed generation source, and the step of disconnecting or de-energizing the distributed source based on the determined islanding status.

One advantage of the present disclosure is the ability to use a smaller and less expensive transformer and enhanced flexibility in the amplitude, waveform and frequency of the injected signal.

Another advantage of the present disclosure is the disclosed method provides for a reduction in the size of the transformer that must be installed at a substation over previously deployed shunt current injection methods.

Another advantage of the present disclosure is that the disclosed method allows much more flexibility in the waveform and frequency of the injected signal, enabling optimization for different purposes (such as improvements in propagation properties) and minimizing harmonic injection problems on specific circuits.

A potential advantage of the present disclosure is that the disclosed method may be utilized upstream from a substation, thereby avoiding the costs associated with installation inside the substation perimeter.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure is directed to systems and methods that use a continuous subharmonic signal, which may be referred to as a power line carrier permissive (PLCP), that is injected at the transmission level or at the distribution level (typically the substation) and detected by any type of DERs in any combination. The disclosed technique uses what is effectively a low-power dynamic voltage restorer as the signal generator. This technique uses a series injection transformer in which the transformer secondary is in series with the distribution feeder.

Figure 2:
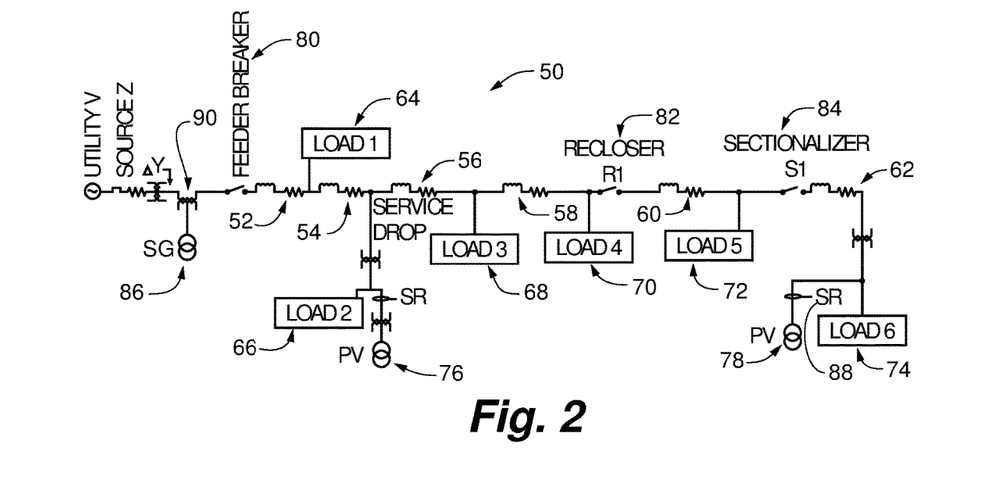
FIG. 2 is a schematic diagram of a grid with photovoltaic distributed generation modules wherein PLC signal injection is implemented using series voltage injection according to an embodiment of the present disclosure.

As depicted in FIG. 2, distribution feeder 50 generally includes feeder series impedances 52, 54, 56, 58, 60, 62, load blocks 64, 66, 68, 70, 72, 74, and distributed generators 76, 78, which are in this case, photovoltaic (PV) systems. Voltage source Utility V at the left, along with its source impedance Source Z, represent the grid from the standpoint of feeder 50. Feeder breaker 80, recloser 82, or sectionalizer 84, may from time-to-time be open, causing feeder 50, or some portion thereof, to become islanded.

According to an embodiment as depicted in FIGS. 2-6, an islanding detection system includes a signal generator/transmitter 86 and one or more signal receivers 88. Notably, signal generator/transmitter 86 is coupled through injection transformer 90 in series in the feeder.

As will be described in further detail below, signal generator or transmitter 86 itself is an inverter that produces the subharmonic waveform to be injected. This system provides flexibility in that the injected harmonic can have any frequency or waveform desired as long as such production does not result in excessive currents in the inverter or a violation of flicker standards. In addition, the magnetic components of the proposed system are expected to be significantly physically smaller than those used in current shunt injection based approaches, thereby enabling more efficient usage of space in substations.

The permissive signal may be bounded to maintain compliance with IEEE 1453 flicker and IEEE 519 harmonic current injection standards. In an embodiment, the permissive signal may be between 0.5% and 3% of the nominal circuit voltage. In another embodiment, the permissive signal may be a 17 Hz signal. The permissive signal is selected so as to provide optimal propagation on the feeder and the greatest ease of detection at the DER receiver sites, while maintaining compliance with the aforementioned standards.

In an embodiment, a large amplitude 17 Hz signal is desired for good signal to noise ratio (SNR), but the amplitude is constrained by flicker limits. Specifically, the signal amplitude must be bounded to maintain compliance with the IEEE 1453-2004 flicker and IEEE 519 harmonic current injection standards.

In an embodiment, the signal may be used to communicate commands to DERs from substation controls or utility operations centers. In one embodiment, presence of the signal would indicate one desired mode of operation while absence of the signal would indicate another desired mode. In another embodiment, the signal may be modulated to communicate binary numbers that correspond to commands.

Figure 3:
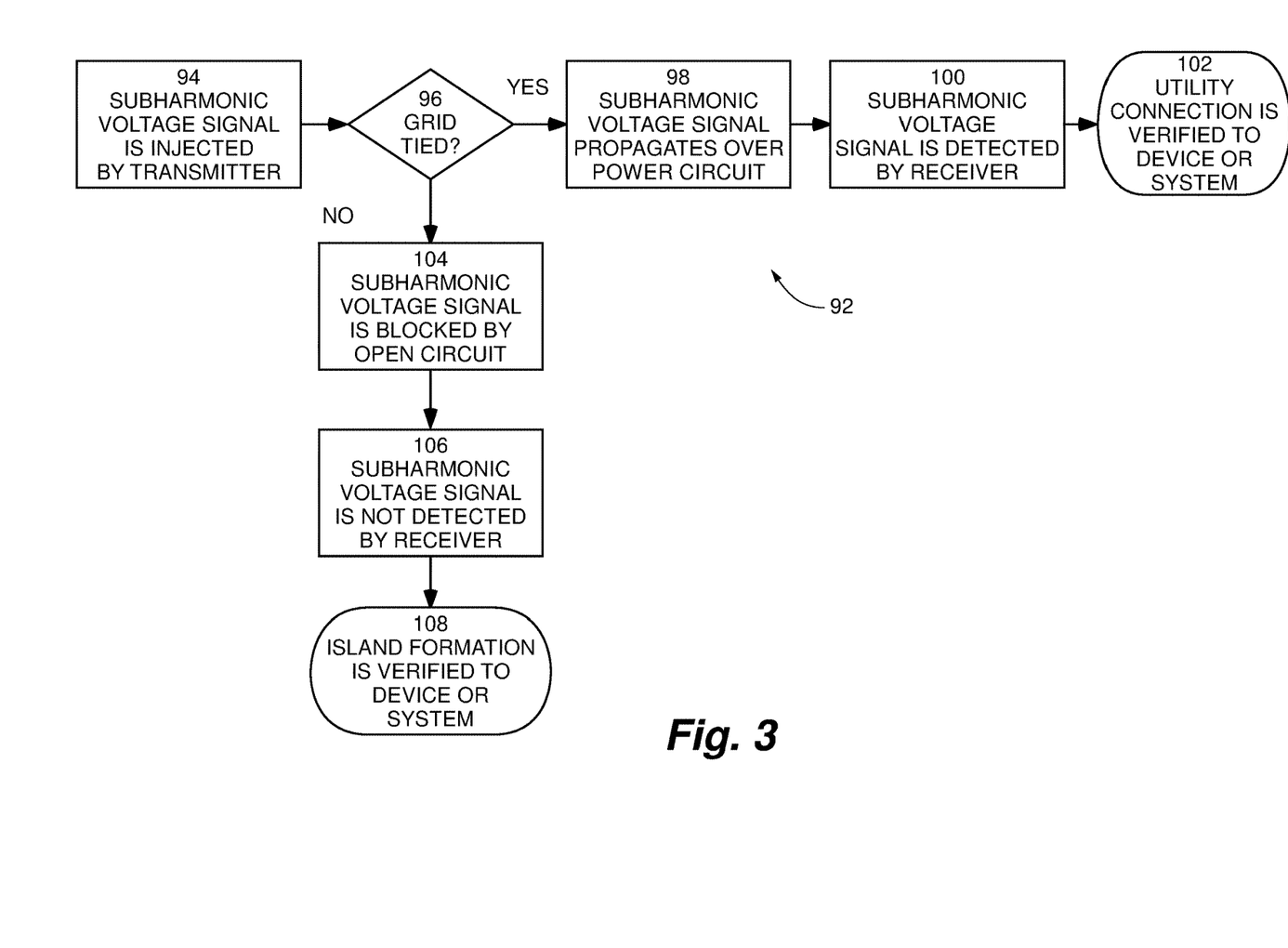
FIG. 3 is a flow chart depicting a method of detecting an islanding condition according to an embodiment of the present disclosure.

FIG. 3 depicts the steps of a method 92 for detecting an islanding condition according to an embodiment of the invention. First, in step 94, a subharmonic voltage signal is injected by a transmitter or signal generator. Decision point 96 represents the two possible conditions—that is, the feeder portion may be tied to the grid (yes) or islanded (no). If the feeder portion is tied to the grid, then at step 98, the subharmonic voltage signal propagates throughout the power circuit, and at step 100 is detected by a receiver. At step 102, a logic signal can be generated so as to provide positive indication of a grid-tied condition.

If the feeder portion is not tied to the grid, then at step 104 the subharmonic signal is blocked by the open element in the circuit, and is not detected by the receiver at step 106. At step 108, a logic signal can be generated so as to provide positive indication of an islanded condition, so that disconnection of the distributed generators can be initiated.

PLC Laboratory Hardware Example

Figure 6:
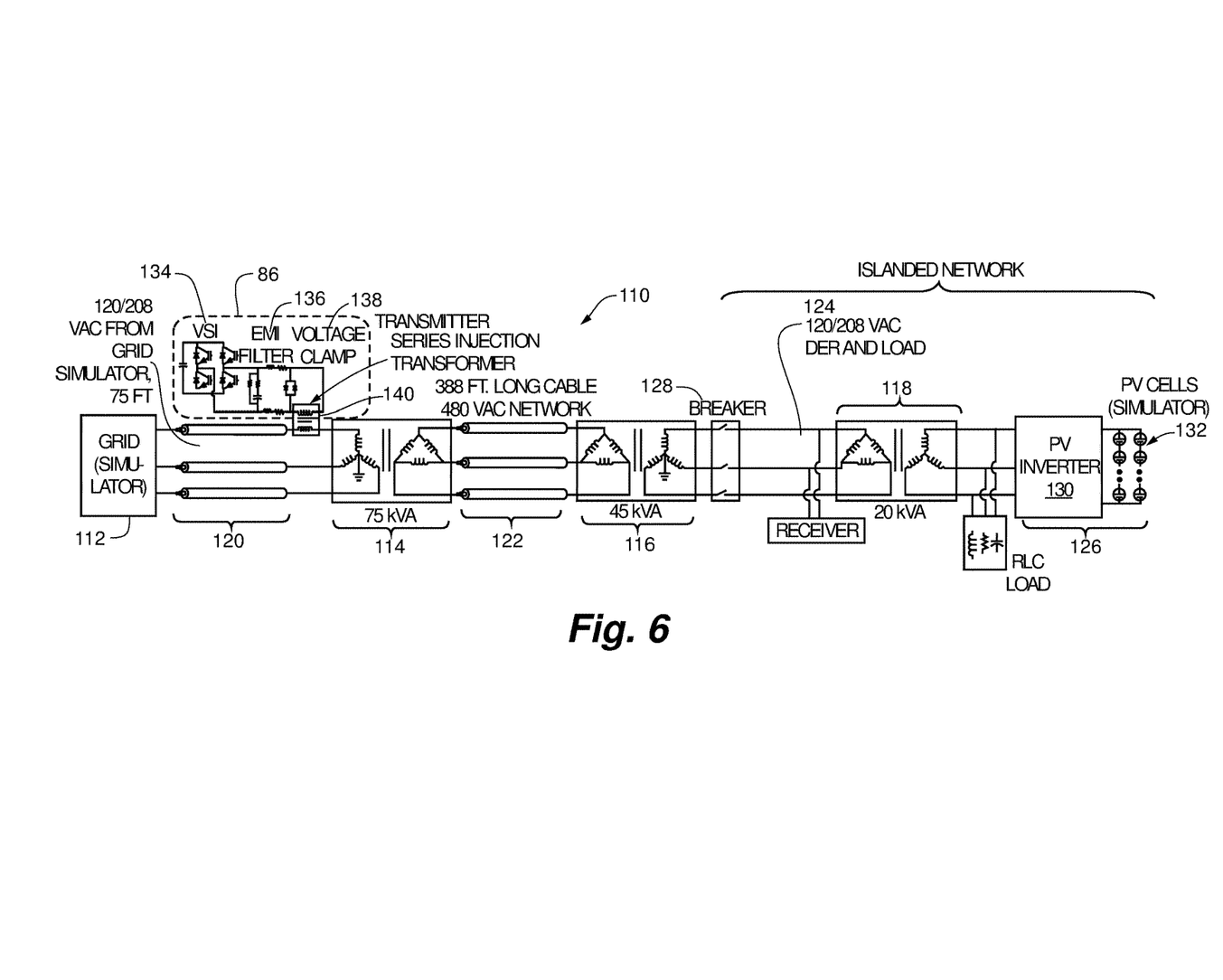
FIG. 6 is a schematic depiction of a laboratory setup for PLC proof of concept testing according to an embodiment of the invention.

To test the apparatus and methods according to embodiments of the invention, a laboratory experiment was devised, and a test system 110 as depicted in FIG. 6 was fabricated. Test system 110 was configured to mimic a distribution circuit with grid connection 112, transformers 114, 116, 118, cabling 120, 122, load 124 and PV source 126. The grid connection was emulated using a power electronics based grid simulator 112.

The transmitter and receiver were separated by two transformers 114, 116, approximately 388 feet of cable 122 and a breaker 128. A commercial PV inverter 130 configured for islanding tests was then connected to the receiver-end of the circuit through transformer 118. The direct current (dc) source for the inverter was power electronics based PV simulator 132.

Figure 4:
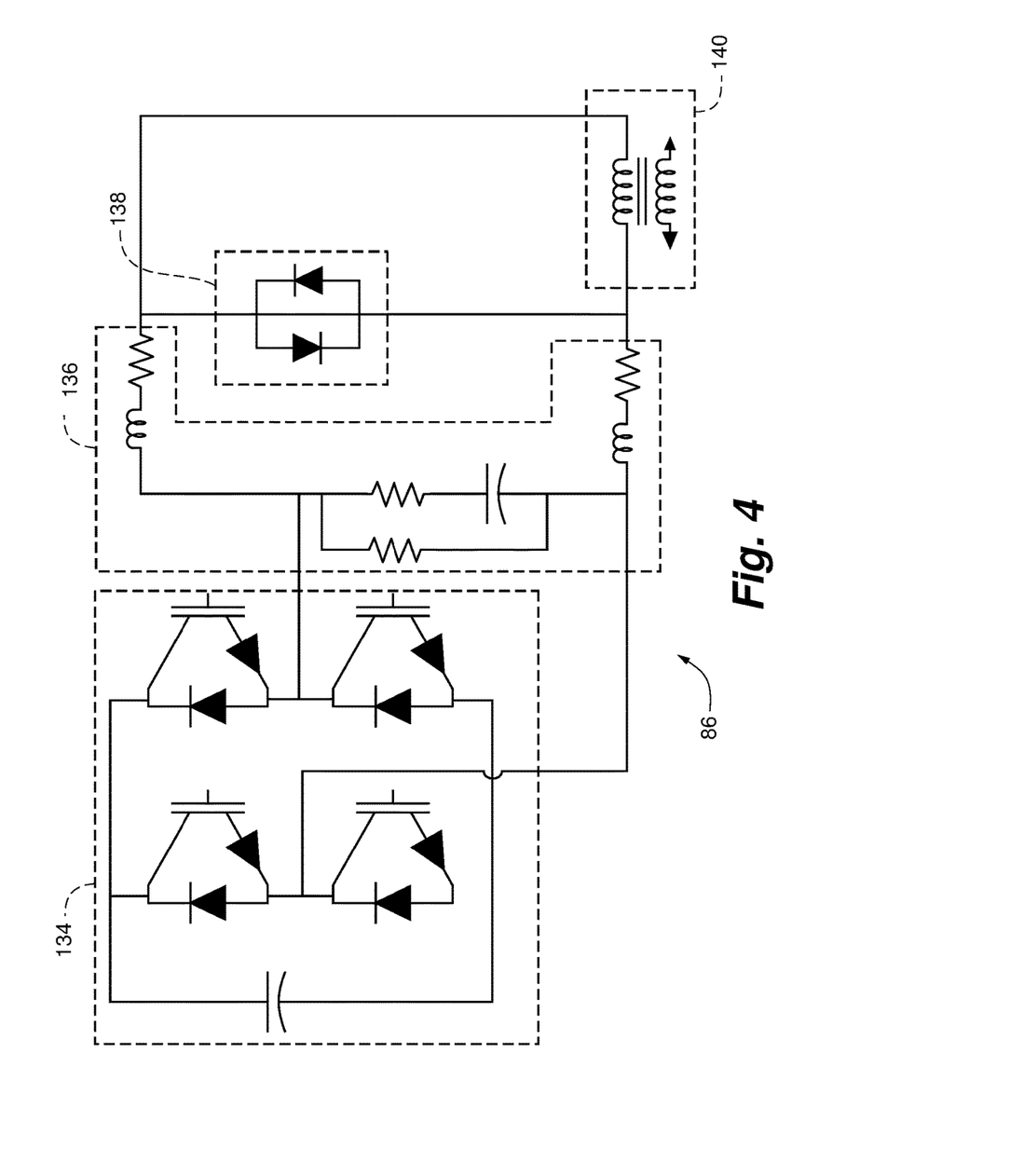
FIG. 4 is a schematic depiction of a subharmonic PLCP transmitter according to an embodiment of the present disclosure.

As depicted in FIGS. 4 and 6, subharmonic signal generator/transmitter 86 generally includes voltage source inverter (VSI) 134, electro-magnetic interference (EMI) filter 136, and diode voltage clamp 138 to protect VSI 134 from current surges. Subharmonic signal generator/transmitter 86 is coupled to the a-phase of grid simulator 112 through series injection transformer 140, which may have a 43:1 step-down ratio.

Figure 5:
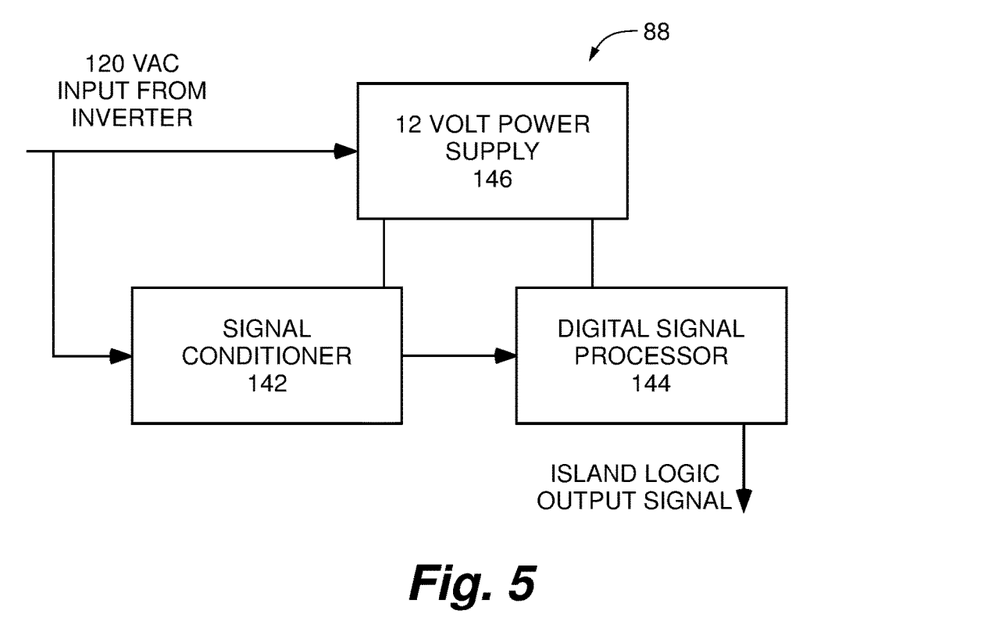
FIG. 5 is a block schematic depiction of a subharmonic PLCP receiver according to an embodiment of the disclosure.

As depicted in FIGS. 5 and 6, receiver 88 generally includes signal conditioner 142, and digital signal processor (DSP) 144, each powered by a 12 volt power supply 146. The output of DSP 144 indicates an island condition through a digital logic output.

Signal conditioner 142 generally includes a 120:5 VRMS step down transformer (not depicted), a sharp-cutoff low-pass filter (for example, an active 5th Order Chebyshev filter) (not depicted), and a gain and level shifting circuit (not depicted). The purpose of the sharp-cutoff low-pass filter was twofold: to serve as an anti-aliasing filter to separate the subharmonic signal from the 60 Hz fundamental frequency, and to reduce the magnitude of the 60 Hz element by roughly 50% to help provide more dynamic range headroom within the DSP. The gain and level shifter circuit slightly reduced the amplitude of the waveform and applied a DC offset to satisfy ADC input requirements. The conditioned signal was then fed into DSP 144, which is a Texas Instruments® TMS320F28335 DSP, executing a detection algorithm.

DSP 144 of PLCP receiver 88 executes one of two algorithms to monitor the subharmonic signal. Algorithm #1 is a Fourier Series (FS) based approach, while Algorithm #2 is also an FS based approach, but with averaging of the 17 Hz amplitude. At startup, DSP 144 initializes all system peripherals, memory allocations, and interrupts. It then waits for an AC voltage to appear on the designated input, and then starts the detection algorithm. The amplitude of the 17 Hz signal is then monitored, and if its amplitude falls below a designated threshold, DSP 144 produces a digital logic output signal to indicate island detection.

When DSP 144 is executing the FS detection scheme, the ADC starts by filling the appropriate data buffers for the Fourier coefficients used by the FS calculation. After 1 second of data has been collected, the 17 Hz amplitude is then obtained. A buffer size that contains 1 second of sampled data is required to properly discern the 17 Hz component due to spectral leakage. The FS is coded to run in real-time using a circular buffer, so after the initial buffer is filled, the 17 Hz amplitude is re-calculated as each sample arrives. This gives the benefit of faster detection time. Using the FS also allows for sampling to occur at rates other than at an integer power of two (1024, 2048, etc.) in contrast to an FFT implementation. An FFT-based algorithm was also tested, but it proved unsatisfactory for reasons that will be discussed below.

Experimental Results

Grid simulator 112 was configured as a 120/208V 60 Hz Wye voltage source, and the subharmonic signal generator/transmitter 86 was configured to generate a 1.9 VRMS sine wave at 17 Hz in series with the a-phase of grid simulator 112. The short term flicker sensation parameter Pst was evaluated. Starting with flicker response thresholds presented in Table 1 of IEEE 1453-2004 it was determined that a 1.34 V signal, injected on one phase of the 120/208V test circuit, would result in a Pst value less than 1.0 for each 120V phase voltage.

TABLE 1

Normalized flickermeter response
for sinusoidal voltage fluctuations
(input relative voltage fluctuation ΔV/V
for one unit of perceptibility at output 5)

| Hz | Voltage fluctuation % | |
|---|---|---|
| | 120-V lamp 60 Hz system | 230-V lamp 50 Hz system |
| 0.5 | 2.457 | 2.340 |
| 1.0 | 1.463 | 1.432 |
| 1.5 | 1.124 | 1.080 |
| 2.0 | 0.940 | 0.862 |
| 2.5 | 0.614 | 0.754 |
| 3.0 | 0.716 | 0.654 |
| 3.5 | 0.636 | 0.568 |
| 4.0 | 0.569 | 0.500 |
| 4.5 | 0.514 | 0.446 |
| 5.0 | 0.465 | 0.398 |
| 5.5 | 0.426 | 0.360 |
| 6.0 | 0.393 | 0.328 |
| 6.5 | 0.366 | 0.300 |
| 7.0 | 0.346 | 0.280 |
| 7.5 | 0.332 | 0.266 |
| 8.0 | 0.323 | 0.256 |
| 8.8 | 0.321 | 0.250 |
| 9.5 | 0.330 | 0.254 |
| 10.0 | 0.339 | 0.260 |
| 10.5 | 0.355 | 0.270 |
| 11.0 | 0.374 | 0.282 |
| 11.5 | 0.394 | 0.296 |
| 12.0 | 0.420 | 0.312 |
| 13.0 | 0.470 | 0.348 |
| 14.0 | 0.530 | 0.388 |
| 15.0 | 0.593 | 0.432 |
| 16.0 | 0.662 | 0.480 |
| 17.0 | 0.737 | 0.530 |
| 18.0 | 0.815 | 0.584 |
| 19.0 | 0.897 | 0.640 |
| 20.0 | 0.981 | 0.700 |
| 21.0 | 1.071 | 0.760 |
| 22.0 | 1.164 | 0.824 |
| 23.0 | 1.262 | 0.890 |
| 24.0 | 1.365 | 0.962 |
| 25.0 | 1.472 | 1.042 |
| 33.33 | Test not required | 2.130 |
| 40.0 | 4.424 | Test not required |

Figure 7:
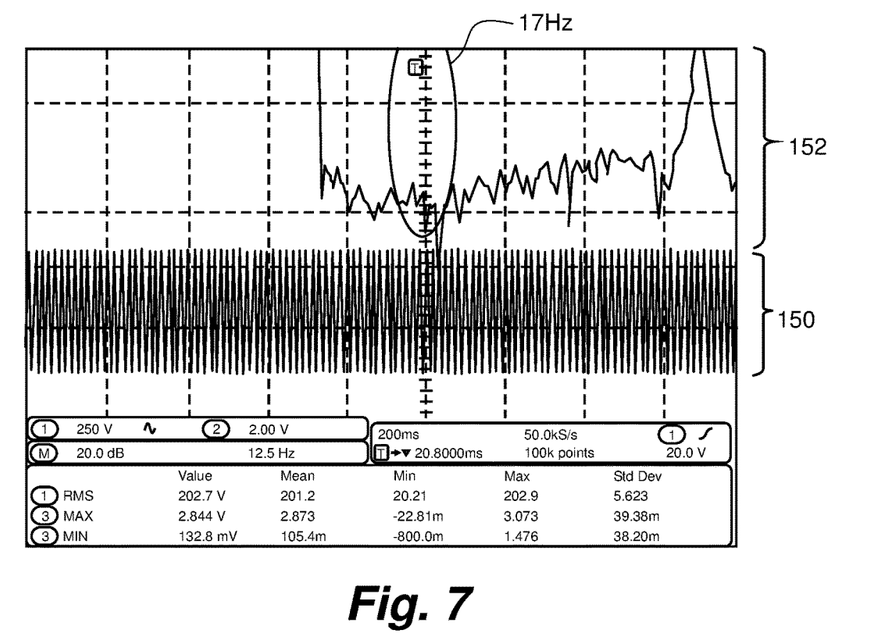
FIG. 7 is an oscilloscope trace depicting line-to-line voltage shown in the time and frequency domains, measured at the receiver, while the DER is grid-connected (the 17 Hz signal injected by the signal generator is clearly visible)
Figure 8:
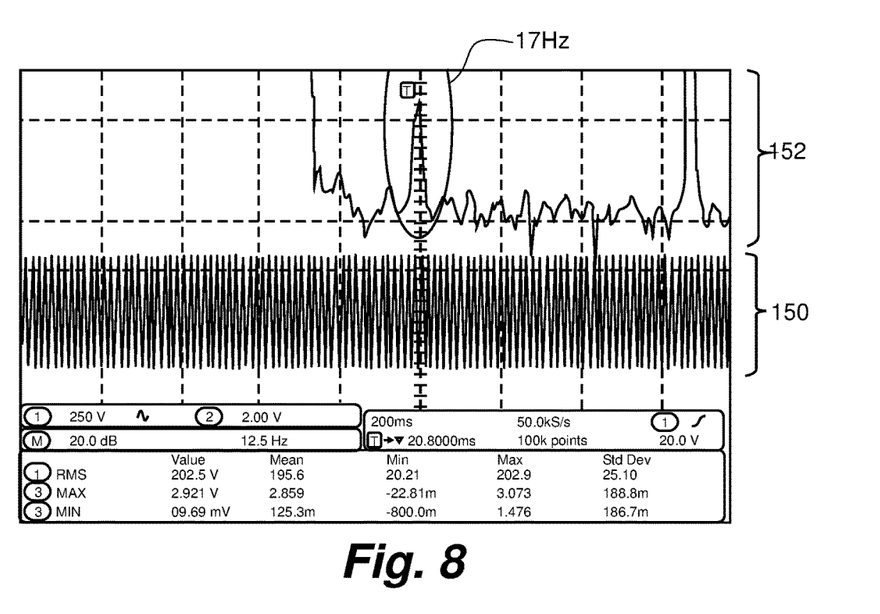
FIG. 8 is an oscilloscope trace depicting line-to-line voltage shown in the time and frequency domains, measured at the receiver, while the DER is islanded (the 17 Hz signal has been lost)

However, since receiver 88 was measuring line-to-line voltage, the signal voltage was boosted to 1.9V. Simulations were performed to verify that the 1.9 VRMS signal would provide sufficient SNR for the selected configuration. The PV inverter and emulator were configured to deliver approximately 17 kW, and the inverter's voltage and frequency ride through limits were increased to bypass the autonomous anti-islanding detection. The RLC load used for islanding tests was configured for both real and reactive power match and a quality factor of 1. For this experiment, the inverter was configured such that the system islanded when the breakers were opened. FIGS. 7 and 8 depict the line-to-line voltage as measured by an oscilloscope at the receiver location for both the connected and islanded cases. The 17 Hz signal is nearly imperceptible in the time-domain voltage traces 150, but shows up clearly in the fast Fourier transform traces 152 of the voltage, if present.

Figure 9:
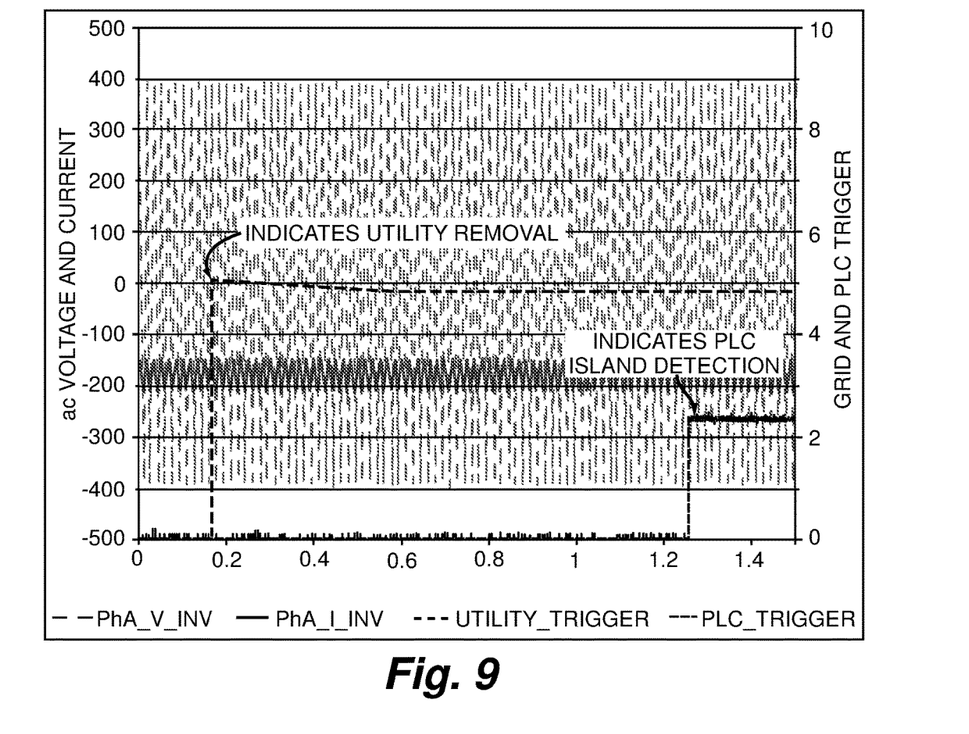
FIG. 9 is a depiction of waveforms from one test of the disclosed method showing AC line voltage, signal indicating utility removal, and signal indicating island detection.

The previously described detection Algorithms, #1 and #2, were evaluated for their islanding detection effectiveness and speed. Each algorithm was tested five times, and the detection time was recorded in each case. Detection times were measured by monitoring the utility disconnection relay signal and receiver logic output, as depicted in FIG. 9. Test results are listed below in Table 2. Algorithm 1 detected more quickly than Algorithm #2, largely because of the averaging window used in Algorithm #2, but both approaches were compliant with the 2 second unintentional island detection requirement stated in the IEEE 1547 standard.

TABLE 2

Island Detection Test Results for Algorithms 1 & 2

| Test | Q factor | Pg/Pl ratio | PLC detection (second) |
|---|---|---|---|
| Algorithm 1 (raw signal) | | | |
| 1 | 1 | 1 | .386 |
| 2 | 1 | 1 | .372 |
| 3 | 1 | 1 | .338 |
| 4 | 1 | 1 | .455 |
| 5 | 1 | 1 | .418 |
| Algorithm 2 (5 & 100 ms averaging window) | | | |
| 6 | 1 | 1 | .574 (5 ms) |
| 7 | 1 | 1 | .807 (5 ms) |
| 8 | 1 | 1 | 1.08 |
| 9 | 1 | 1 | 1.08 |
| 10 | 1 | 1 | 1.08 |

As discussed above, an FFT-based algorithm was also tested, but it did not work well due to its sensitivity to spectral leakage. When an island forms, the frequency shifts slightly off of 60 Hz, which will cause significant spectral leakage in the 60-Hz FFT. The spectral leakage causes the FFT to show a 17 Hz component even after the island forms. The FS was more immune to this because of how it was implemented.

Figure 10:
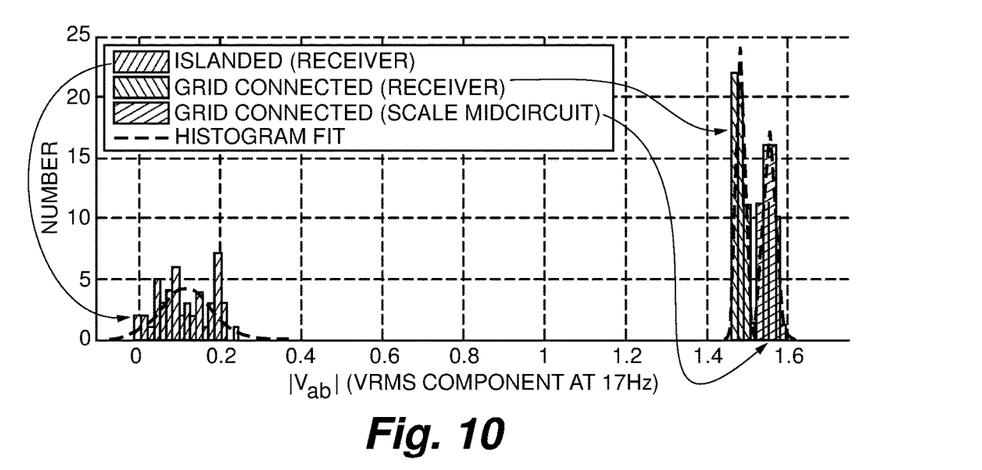
FIG. 10 is a histogram plot for signal strengths when islanded and grid connected.

It is noted that the dynamics of the PV inverter, which includes a perturb-and-observe style maximum power tracker, will naturally introduce some low frequency perturbations. This results in variation of the subharmonics, including 17 Hz. The measured 17 Hz component is thus expected to vary slightly. This raises the concern of false trip immunity. To test the PLCP signal integrity and attenuation, the line-to-line voltage was sampled several times in the islanded and grid-connected (grid simulator) modes of operation. Samples were taken at the receiver while islanded and connected and on the 480V circuit on the Δ-phase of the 45 kVA transformer. The magnitude of the 17 Hz component in each case was then acquired through post processing using MATLAB® software available from MathWorks® of Natick, Mass., and evaluated statistically by fitting the data to a normal distribution. Samples from the 480V circuit were scaled to be equivalent to a 120/208V circuit for easy comparison. The histogram of FIG. 10 provides a graphic depiction of the results.

When the inverter is islanded, the 17 Hz subharmonic is measured at the receiver to have a mean amplitude of 0.116 VRMS and a standard deviation of 63.7 mV. With the grid connected, the PLCP has a mean strength of 1.483 VRMS at the receiver and varies with a standard deviation of 10.3 mV. Just before the 45 kVA transformer, the scaled PLCP has a mean amplitude of 1.553 VRMS and standard deviation of 16.4 mV. This indicates a mild 4.71% or 0.4 dB attenuation through the 45 kVA transformer. If the threshold for island detection were selected to be 0.75 VRMS, these results indicate that the threshold would be 71 standard deviations below the measured signal level when grid connected and 10 standard deviations above the islanded signal level, resulting in negligible false detection and negligible failed detection probabilities. It is expected that similar results would be achieved using these methods in a full-scale grid and feeder system.

Simulation Results for Medium Voltage Network

To evaluate how the proposed subharmonic PLC signal would propagate through a distribution network and to illustrate the configuration options, a simple distribution circuit was simulated using MATLAB®. Three simulation experiments were conducted to evaluate performance including (1) PLCP injection on one phase with balanced load, (2) PLCP injection on three phases with balanced load, and (3) PLCP injection on three phases with unbalanced load. Fourier Series analysis was then applied to the simulated load voltages to quantify the 17 Hz component detectable by the receiver (located at the load).

Figure 11:
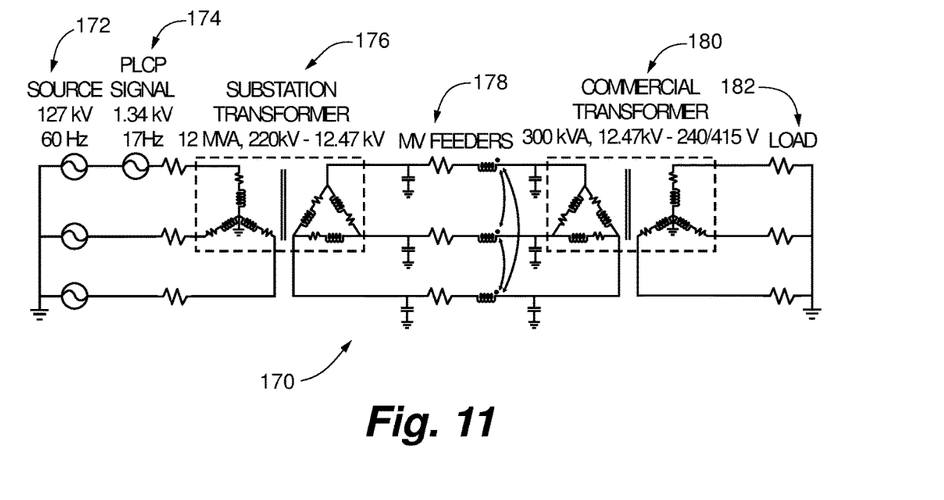
FIG. 11 is a depiction of a network model used for simulation study with single-phase injection according to an embodiment of the disclosure.

As depicted in FIG. 11, a simulated network 170 was supplied by a 220 kV, 60 Hz source 172. For single-phase injection, a 1.34 kV amplitude, 17 Hz subharmonic signal 174 was added in series with the a-phase to act as the PLC permissive signal supplied over the transmission circuit. The transmission source was stepped down through a substation transformer 176 to supply a 12.47 kV three-wire distribution feeder 178. Assuming a 12 MVA Delta-Wye transformer 176 with a phase voltage of 127.0 kV, the base current is found to be 31.50 A, and the impedance base of the transformer was thus found to be 4032Ω. The resistance was set to 1.05% of the total impedance and the reactance set to 5.65%. This results in a resistance of 42.34Ω and an inductance of 604.3 mH.

In simulation, the feeder cable parameters were computed assuming an 8050 meter (about 5 miles) long feeder constructed from shielded single-phase EPR cables arranged equidistant from each other. The transmission line was modeled using a pi configuration with the parameters found in Table 3. A second commercial transformer 180 with a Delta-Wye configuration was used in the simulation to step the voltage down to 240/415V to supply load 182. Transformer 180 was modeled as a 300 kVA transformer with a base voltage of 12.47 kV; the resulting impedance was 1555Ω The resistance and inductance were found to be 24.57Ω and 195.6 mH respectively. The load was simulated as a purely resistive element. The magnitude of the 17 Hz subharmonic was measured at the load for each phase-to-neutral voltage.

TABLE 3

Transmission line parameters, computed using specifications for Kerite 190C15-15 kV cable.

| Parameter | Value |
| --- | --- |
| Outer Radius | 0.0145 m |
| Inner Radius | 0.0063 m |
| Conductor Spacing | 0.0290 m |
| Cross-sectional Area | $1.2668 \times 10^{-4}$ m$^2$ |
| Length | 8050 m |
| Cable Capacitance per Length | $1.6165 \times 10^{-10}$ F/m |
| Cable Inductance per Length | $1.6519 \times 10^{-6}$ H/m |
| Cable Resistance per Length | $1.3267 \times 10^{-4}$ Ω/m |

Figure 12:
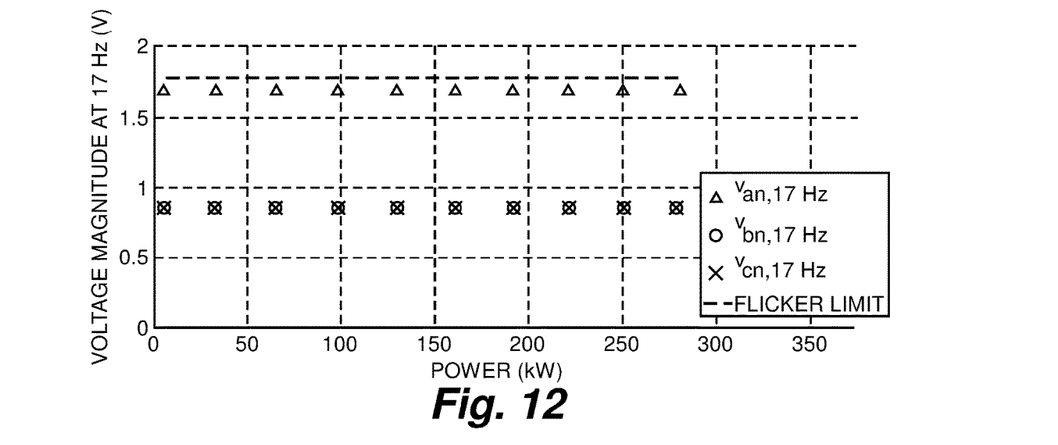
FIG. 12 is a depiction of the magnitude of the 17 Hz signal at the 240V load compared to the flicker limit with single-phase injection according to an embodiment of the disclosure.

Results for the single-phase injection simulation are shown in FIG. 12; the PLCP component is detectable at the load (primarily in the a-phase) over the full range of output power levels. It is assumed each 240V phase will be split into 120V circuits for lighting loads; thus the flicker limit is computed using the 0.737% limit cited in Table 1 of IEEE 1453-2004. In each case, the magnitude of the signal is strong enough for ease of detection while falling below the recommended flicker limit. It is noted that the signal is present on the b- and c-phases, although the signal is approximately half the amplitude.

Single phase injection would be suitable for commercial implementations wherein power inverters connect to and monitor all three phases. However there may be some reluctance in using this scheme for residential inverters since single-phase units connected to only the b- or c-phases may not detect the permissive signal as robustly.

Figure 13:
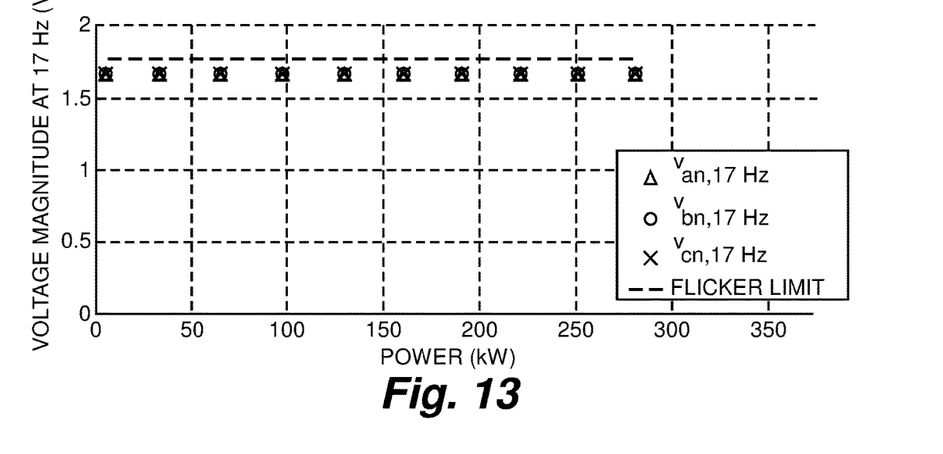
FIG. 13 is a depiction of the magnitude of the 17 Hz signal at the 240V load in the three-phase balanced system with three-phase injection according to an embodiment of the disclosure.

Results for the three-phase injection simulation with balanced load are depicted in FIG. 13. The magnitudes of the injected signals were reduced by a third from the single phase case (to 893 VRMS). The 17 Hz signal is now equally present in all three phases.

Figure 14:
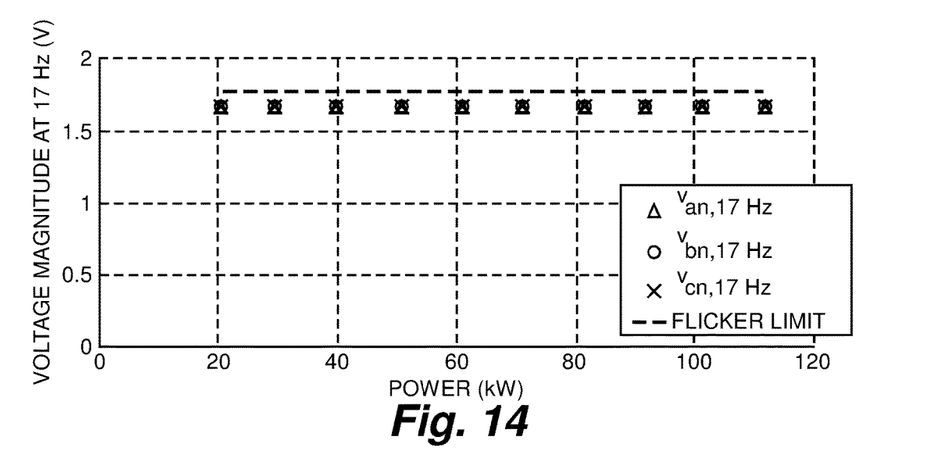
FIG. 14 is a depiction of the magnitude of the 17 Hz signal at the 240V load in the three-phase unbalanced system with three-phase injection according to an embodiment of the disclosure.

The results for an unbalanced load are depicted in FIG. 14. Here the b- and cphase loads were set to 5.24Ω and 7.85Ω respectively while the a-phase load was varied. There is negligible difference between the magnitudes of the 17 Hz signal read at the load for each phase, and the signal is still large enough to be detectable on all three phases while remaining below the flicker limit. Three-phase injection is appropriate for circuits containing commercial and/or residential units.

The simulation results are consistent with what one would expect from circuit theory. A low frequency signal would not be expected to attenuate appreciably over the network. The primary concern would be the expected 71.7% reduction in magnetizing reactance of each transformer at 17 Hz compared to 60 Hz. However, most transformers have such a large magnetizing inductance, that the magnetizing reactance at this subharmonic frequency is still sufficient.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein.

For purposes of interpreting the claims, it is expressly intended that the provisions of 35 U.S.C. § 112(f) are not to be invoked unless the specific terms "means for" or "step for" are recited in a claim.

What is claimed is:

1. A method for eliminating an island condition in a power grid including at least one distributed energy source selectively electrically coupled to the power grid through a switch electrically coupling a feeder to the power grid, the method comprising:
   using a transmitter to inject a subharmonic voltage signal into the power grid through an injection transformer coupled in series with the feeder on a power grid side of the switch;
   coupling a receiver on a distributed energy source side of the switch;
   detecting the presence or absence of the subharmonic voltage signal using the receiver; and
   if the subharmonic voltage signal is absent, disconnecting the at least one distributed energy source from the feeder.

2. The method of claim 1, wherein the step of using the transmitter includes coupling the injection transformer in series with more than one phase of a multi-phase power feeder.

3. The method of claim 1, wherein the step of using the transmitter includes coupling the injection transformer in series with a single phase of a multi-phase power feeder.

4. A system for detecting an island condition in a feeder of a power grid, wherein the feeder includes at least one distributed energy source selectively electrically coupled to the power grid through a switch, the system comprising:
- a signal generator electrically coupled to the power grid through an injection transformer coupled in series with the feeder, the signal generator including a voltage source inverter, the signal generator emitting a signal through the power grid and feeder at a subharmonic frequency of a frequency of the power grid; and
- a receiver electrically coupled to the feeder, the receiver including a digital signal processor providing a logic signal output, the logic signal output indicating whether the signal emitted by the signal generator is detected by the receiver.

5. The system of claim 4, wherein the subharmonic frequency is 17 Hertz.

6. The system of claim 4, wherein the signal generator includes an electro-magnetic interference filter and a voltage clamp.

7. The system of claim 4, wherein the receiver includes a sharp-cutoff low-pass filter.

8. The system of claim 4, wherein the digital signal processor runs an algorithm.

9. The system of claim 8, wherein the algorithm is based on a Fourier series calculation.

10. The system of claim 8, wherein the algorithm is based on a Fourier series calculation with
averaging of results at the subharmonic frequency.

11. The system of claim 4, wherein the injection transformer is coupled in series with a single phase of a multi-phase power system.

12. The system of claim 4, wherein the injection transformer is coupled in series with more than one phase of a multi-phase power system.

13. The system of claim 4, wherein the at least one distributed energy source includes photovoltaic cells.

14. The system of claim 4, wherein the at least one distributed energy source includes a wind-powered generator.

15. The system of claim 4, wherein the at least one distributed energy source includes a fossil-fuel powered generator.

16. A method for detecting an island condition in a feeder of an electrical power grid, the feeder including at least one distributed electrical energy source selectively electrically coupled to the power grid through a switch, the method comprising:
- coupling a signal generator to a power grid side of the switch using an injection transformer in series with the feeder;
- generating a signal at a subharmonic frequency of the power grid using the signal generator, the signal being injected into the power grid and feeder through the injection transformer;
- electrically coupling a signal receiver to the power grid and feeder on a distributed energy source side of the switch;
- using the signal receiver to detect the presence or absence of the signal; and
- if the signal is absent, disconnecting the distributed energy source from the feeder and grid.

17. The method of claim 16, wherein the step of coupling a signal generator includes connecting the injection transformer in series with a single phase of a multi-phase power system.

18. The method of claim 16, wherein the step of coupling a signal generator includes connecting the injection transformer in series with more than one phase of a multi-phase power system.

* * * * *